United States Patent [19]

Homer

[11] Patent Number: 4,836,934

[45] Date of Patent: Jun. 6, 1989

[54] SYSTEM FOR REMOVING LIQUID FROM SLURRIES OF LIQUID AND PARTICULATE MATERIAL

[75] Inventor: John C. Homer, Chardon, Ohio

[73] Assignee: General Signal Corporation, Stamford, Conn.

[21] Appl. No.: 833,943

[22] Filed: Feb. 26, 1986

[51] Int. Cl.[4] .............................................. B01D 36/00

[52] U.S. Cl. ...................................... 210/771; 210/86; 210/104; 210/438; 210/440

[58] Field of Search ................. 34/69, 90, 168, 243 R, 34/169; 210/86, 104, 274, 288, 410, 416.1, 443, 472, 513, 539, 540, 542, 770, 279, 771, 438, 439, 440; 252/633

[56] References Cited

U.S. PATENT DOCUMENTS

| | | | |
|---|---|---|---|
| 2,447,135 | 8/1948 | Pick et al. | 210/288 |
| 3,448,859 | 6/1969 | Hall et al. | 210/770 |
| 3,846,305 | 11/1974 | Schreiber et al. | 210/279 |
| 4,230,578 | 10/1980 | Culp et al. | 210/86 |
| 4,290,908 | 9/1981 | Horiuchi et al. | 252/633 |
| 4,349,436 | 9/1982 | Kaump | 210/104 |

*Primary Examiner*—Ivars Cintins
*Attorney, Agent, or Firm*—Martin LuKacher

[57] ABSTRACT

In order to separate liquids from slurries containing particulate material, and particularly from slurries of water and spent ion exchange materials which are used for water conditioning in the operation of nuclear power plants and must be disposed of without any significant volume of free standing water therein, a vessel is provided which is filled with the slurry. The bottom of the vessel is conical and defines a region for the collection of water which passes thereto radially through a structure which filters the water and supports a bed of the particulate material thereon. A discharge tube extends longitudinally of the vessel into the region. A level sensor is disposed alongside the tube. A passage into the top of the vessel is provided for blowing air through the bed to force interstitial water through the bed into the region. A system of pumps and blowers is operated in accordance with the level of liquid and solid material in the vessel so as to provide for discharge of the liquid collected in the region, the formation of a tightly packed bed of particulate material and the blowing of air through the bed after substantially all the water has been discharged so as to free additional water and enable it to be discharged, thereby removing the liquid from the slurry and de-watering the material in a relatively short period of time to the extent required by governmental regulations for the disposal of low level radioactive waste materials (radwaste), for example in eight hours, and providing efficient utilization of the volume of the vessel in preparation for storage.

40 Claims, 4 Drawing Sheets

CONTROL LOGIC
CN
HEPA
DPE
CV 158
VAC RELIEF
ROTARY VANE VAC PUMP
M
HS
COALESCER
CV
PUMP
DISTRIB.
WATER/AIR SEPARATOR
WASTE SLURRY FEED FROM HOLDING TANK
ATMOSPHERIC VENT OR HVAC
COMPRESSED AIR SUPPLY
WATER FILTRATE DISCHARGE
D
V
10
12
14
16
18
20
22
24
28
30
36
44
52
60
82
84
86
88
90
92
94
96
98
100
110
120
122
124
126
128
130
132
133
138
140
142
144
146
148
150
152
154
156
160
162

SYSTEM FOR REMOVING LIQUID FROM SLURRIES OF LIQUID AND PARTICULATE MATERIAL

DESCRIPTION

The present invention relates to methods and apparatus for the removal of liquid from slurries of liquid and solid particulate material, and particularly for the de-watering of waste material such as ion exchange resins and other media (particularly bead type ion exchange resins) which are used in nuclear power plants so as to enable such materials to be prepared for disposal with efficient utilization of the volume of the vessel containing such materials and with free standing water reduced below the limits required by governmental regulation.

Various types of materials are used for water conditioning, principally removal of radioactive constituents, in nuclear power plants. Water conditioning involves removal of solids and soluble ions by passing the water through filters of natural and synthetic materials whose properties permit efficient removal of contaminants. The most commonly used material for water conditioning in nuclear power plants are ion exchange resins. These resins may be in the form of small beads which are substantially spherical and usually from 300-600 microns in diameter. The most commonly used material is the copolymer of divinylbenzene and vinylbenzene which is treated to provide many active sites which will react with and therefore remove free contaminant ions from the water. When the resin has absorbed its limit of ions and/or particulate material, it is spent and must be replaced. Disposal of the spent conditioning material which is usually radioactive at least to some extent (low level) is constrained by governmental regulation. Regulations concerning the burial of such radwaste material require that the water be removed to very low level, for example less than one percent by volume (see the United States Code of Federal Regulations Volume 10, §61.56(a)(3) and §61.56(b)(2)).

In view of such stringent requirements, various methods have been proposed for preparation of radwaste material for disposal. These methods include solidification with binders, such as cement (see Stock et al, U.S. Pat. Nos. 4,030,788 issued June 21, 1977 and 4,299,722 issued Nov. 10, 1981 and Greaves, U.S. Pat. No. 4,427,023 issued Jan. 24, 1984). Also the materials have been incinerated, which requires subsequent treatment of the ash. Dewatering of the radwaste material is preferred in many cases. However, conventional methods require expensive filtration and centrifuging.

It is desirable that de-watering be carried out in the container in which the material will be disposed, for example by burying the container at a disposal site. However, then de-watering processes have taken an extremely long period of time, for example, as long as five days to enable the water to flow by gravity to the bottom of the container. Such containers are called liners since they are steel drums which are adapted to be used as liners within lead shielded casks. The standard practice has been to install cartridge filters on a plastic pipe array in the bottom of the liner and to remove the water by pumping through the filters. The filters waste a great deal of liner space (the volume efficiency of this standard practice thereby being very low). It is important that volume efficiency be high since the cost of disposal is computed in terms of the volume of the disposal site that is utilized.

The long period of time for de-watering is believed to be caused by surface tension and viscosity effects which hold back the interstitial water. This is particularly troublesome in bead resin de-watering, since water surface tension at each point of contact between adjacent beads holds back some of the water that is otherwise free to flow by gravity to the bottom of the liner.

It is therefore the principal object of the present invention to provide improved apparatus and an improved method for the removal of liquid from slurries of liquid and particulate material and particularly for de-watering f water slurries of nuclear radwaste material in preparation for the disposal thereof.

It is another object of the present invention to provide an improved system (method and apparatus) for the de-watering of bead type ion exchange resins so as to enable such resins, when spent, to be containerized with high volume efficiency utilization of their containers.

It is a still further object of the present invention to provide an improved vessel wherein water slurries, particularly of nuclear radwaste materials and especially bead type ion exchange resins, may be de-watered in situ in the container with high volume efficiency utilization of the container and with free standing water below levels specified by governmental regulations.

It is a still further object of the present invention to provide an improved system (method and apparatus) for the de-watering of liquid/solid particulate slurries, and particularly nuclear radwaste slurries as contain bead shaped particles, in a matter of hours, rather than days, as heretofore has been required, to meet the free standing water limitations imposed by governmental regulation.

Briefly described, apparatus for de-watering the slurries of liquid in solid particles in accordance with the invention utilizes a vessel having a conical bottom with means disposed on the bottom for supporting a bed of the solid particles and providing for the egress of liquid radially therethrough to a liquid collection region around the apex of the conical bottom. The vessel has a pipe communicating with the region and preferably extending from the top of the vessel down to the bottom for the discharge of the liquid which is collected in the region. A system embodying the invention also provides the vessel with a gas (preferably air) inlet at the top thereof through which the gas is blown after the discharge of substantially all liquid except that which is held interstitially of the particles. The air flow forces the interstitial liquid down through the bed to the discharge region. Preferably, the discharge pipe is provided with openings which enable the water which is blown into the region to be atomized and transferred with the air up through the discharge pipe where the liquid is separated from the air and the air blown back through the bed until sufficient liquid is withdrawn to below the amount of free standing liquid which is desired to be retained in the vessel.

The foregoing and other objects, features and advantages of the invention, as well as the presently preferred embodiment thereof and the best mode presently known for carrying out the invention, will become more apparent from a reading of the following description in connection with the accompanying drawings in which.

Figure 3:
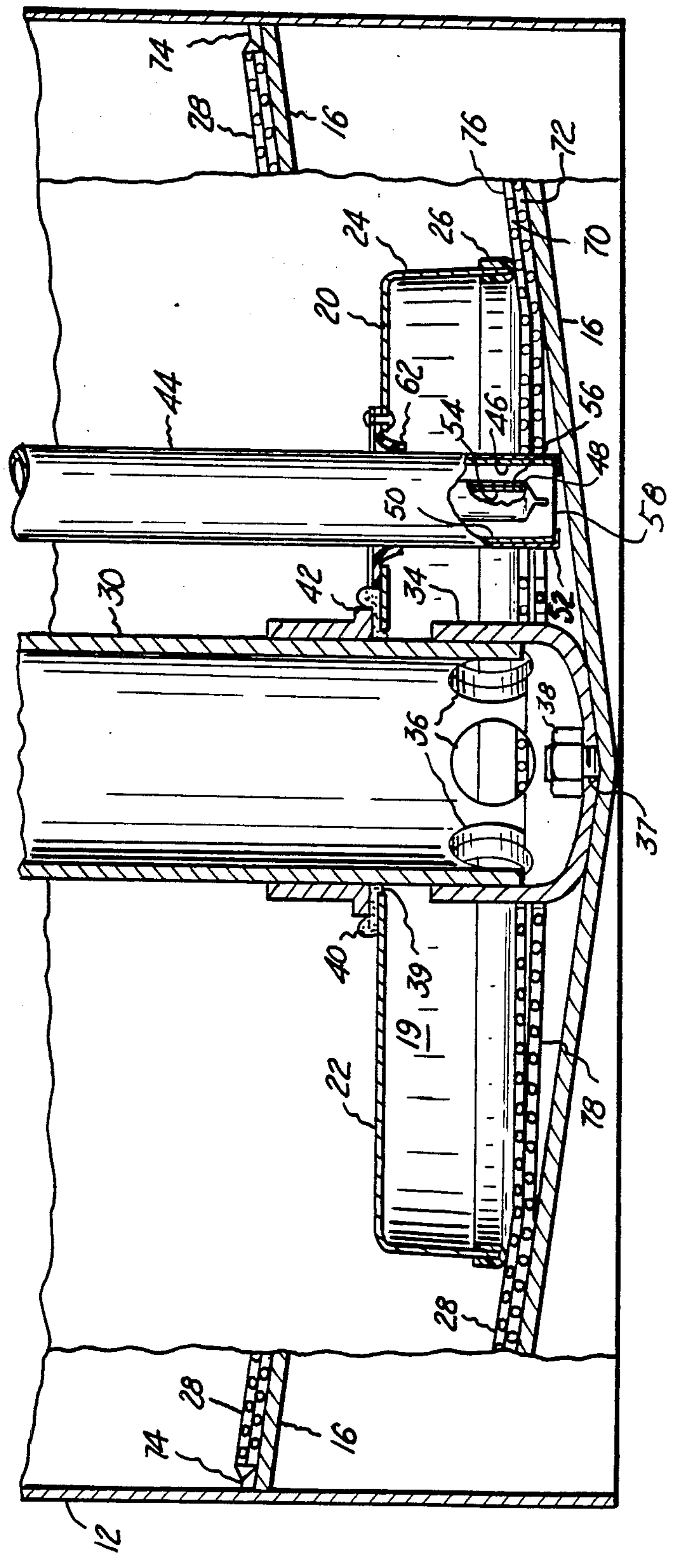
FIG. 3 is a fragmentary, sectional, elevational view illustrating in detail the structure of the bottom of the vessel shown in FIG. 1.
Figure 4A:
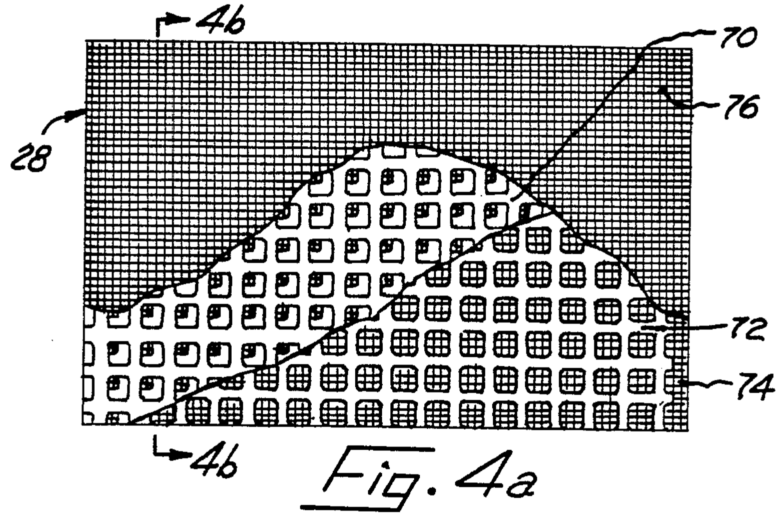
Figure 4B:
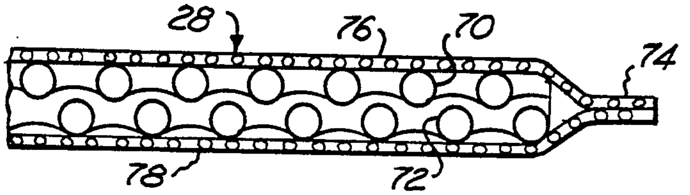
Figure 4C:
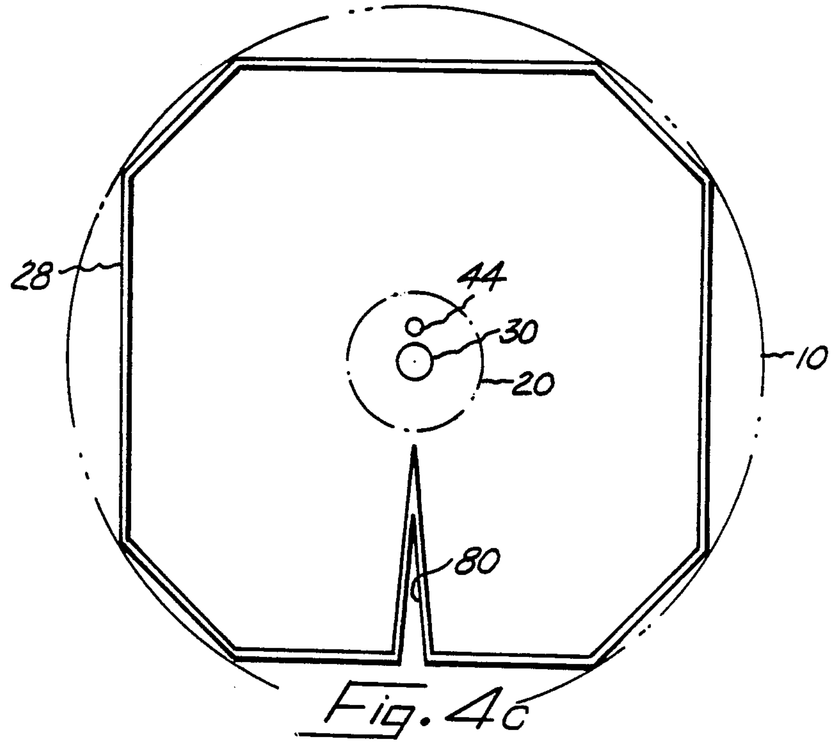

FIG. 4*a* is a fragmentary view partially broken away to illustrate the liquid filter and particle bed support which is utilized at the bottom of the vessel and is shown in detail in FIG. 3;

FIG. 4*b* is a fragmentary sectional view taken generally along the line 4*b*—4*b* in FIG. 4*a;* and FIG. 4*c* is a plan view showing the filter and support structure illustrated in FIGS. 4*a* and 4*b*.

Figure 1:
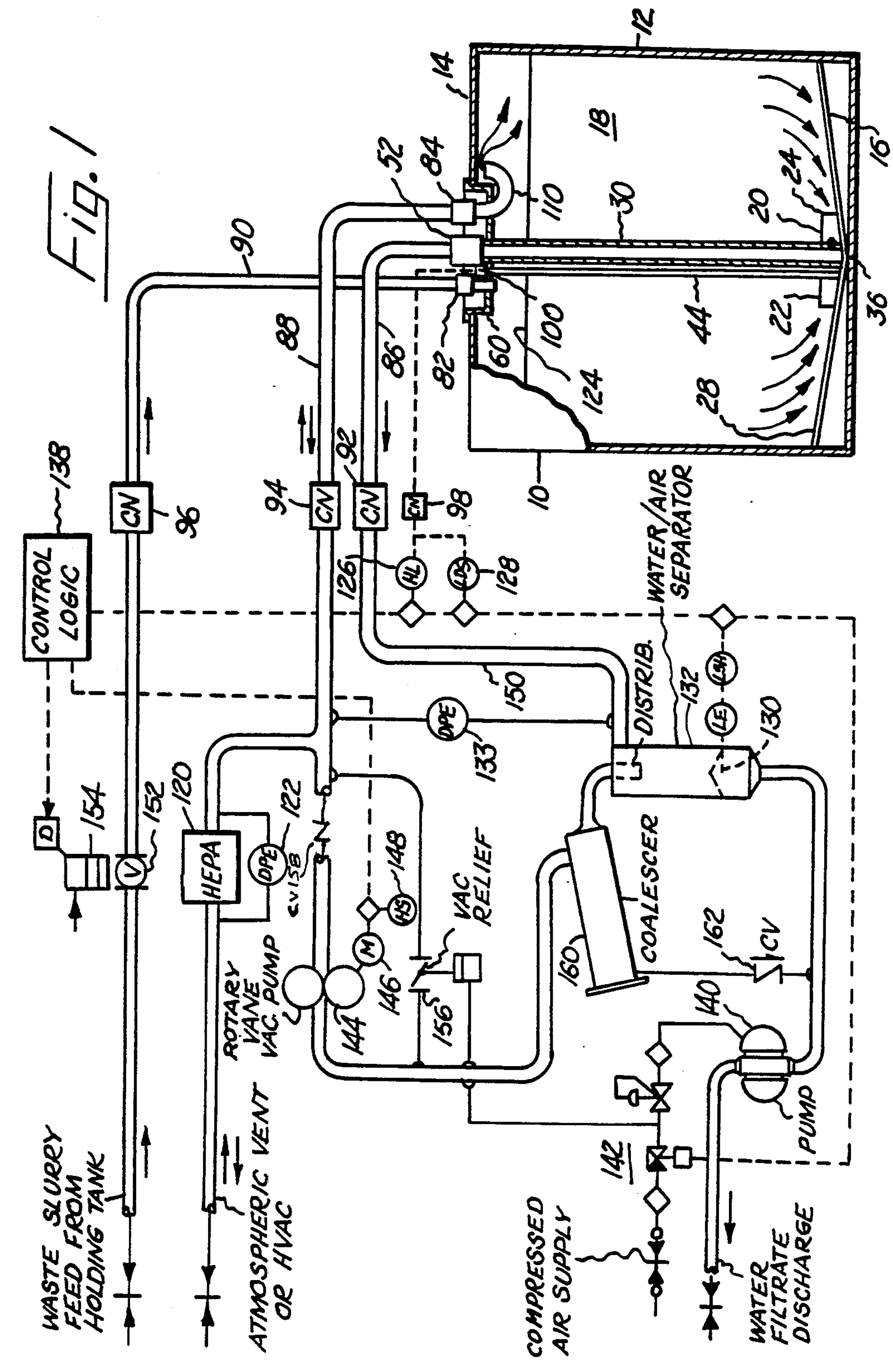
FIG. 1 is a schematic diagram illustrating a system embodying the invention.

Referring to FIG. 1, there is shown a vessel 10 in which a slurry of liquid (water) and solid particulate material (for example spent ion exchange resin beads) is de-watered and containerized. The vessel is cylindrical and may be a drum which is made of steel having a cylindrical wall 12, a top 14 and a conical bottom 16. The apex of the conical bottom is at the center of the vessel. In other words, the cone is coaxial with the vessel. The cone includes an obtuse angle preferably of about 164° to 168°. That angle is a compromise between hydraulic requirements of the system and the maximization of the volume of the vessel which contains the de-watered resin. It is desirable to maximize the utilization of the volume, since disposal costs vary with the volume of disposal site which is utilized; the vessels being buried at the site.

The conical bottom defines a sump region 19 centrally thereof for the collection of the water from the bed 18 of particulate material in the container 10. The sump region is defined by an inverted pan 20 which may be made of metal. The pan has a top 22 and a cylindrical wall 24 (see also FIGS. 3 and 4*c*). The edges of the wall 24 are covered with a rim 26 of resilient material, such as PVC (polyvinyl chloride) which is connected, molded or shrink-wrapped, thereon. The edges rest upon a porous support and filter panel 28 which is disposed upon the conical bottom 16 of the vessel 10. This panel 28 permits the flow of water radially therethrough into the sump region 19 at the center of the conical bottom. The panel 28 supports the bed 18 of solid particulate material (resin beads).

Disposed centrally, and particularly coaxially of the vessel 10 and the conical bottom 16, is a discharge pipe or tube 30. The tube extends through an outlet coupling pipe 32 (FIG. 2) out of the top 14 of the vessel 10. The bottom of the tube 30 is attached to a cup 34 (see FIG. 3), and extends into the sump region 19. A plurality of holes 36 (6 holes being suitable) extend radially, through the wall of the tube 30 and the cup 34, into the sump region 19 and permit the passage of the water collected in the region into the tube 30. A nut 38, on a screw 37 welded at the apex of the bottom 16, fastens cup 34, therefore tube 30 and thereby pan 20 and porous filter 28 to the conical bottom 16. The tube 30 extends through a hole in the center of the pan 20. A seal 40 around the tube 30 closes the hole 39. The seal may be elastomeric material which is compressed by a flange 42 on the outer periphery of the tube 30.

A level sensor or probe 44 also extends longitudinally through the vessel alongside the tube 30. The level sensor 44 is a cylindrical assembly. Its lower end extends into the sump region so as to enable the measurement of the level well down into the sump and below the bottom of the holes 36. The holes 36 are sized such that the sum of their cross sectional area is equal to or greater than the cross sectional area of the tube 30. Also, the holes 36 are small enough to allow air flow to aspirate water entering the sump. The volume of water remaining in the sump below the holes is well within regulatory limits for free standing water (e.g. within 10% of regulatory limit). The angle of the conical bottom increases resolution of the level sensor from approximately 1 inch for flat bottom to 4 inches for a 164° cone at a regulatory limit of ½ percent of a 170 cubic foot vessel 10. It will be appreciated from the following discussion of the method of operation of the system provided by the invention that the water discharged will drain most of the water in the sump region even below the level of the holes 36.

The level sensor is a coaxial, dual level sensing system having an outer sensor 46 for detecting the level of the resin/water mixture and an inner sensor 48 for detecting the water level. The outer sensor is constructed from a tube 50 of insulating material, such as plastic (PVC being suitable). A foil of conductive material is wrapped on the exterior surface of the tube 50. This foil is insulated by a layer 52 of insulating material, such as a PVC jacket shrink-fit on the tube 50. The inner water level sensor 48 is disposed coaxially with the outer sensor and is made of a tube 54 of conductive material on which a insulating layer, such as a PVC jacket 56, is disposed. The jacket is sealed at the bottom to close the tube 54. A filter screen 58 closes the bottom of the outer sensor 46 and permits the egress of water while excluding solid material. The conductive element of the outer sensor 46 extends the length of the inner sensor tube and all the way from the bottom of the sensor, well down into the sump, up to the top of the sensor where it extends through the indented portion 60 of the top cover 14. Electrical connections, indicated by the dash lines in FIG. 1 (which schematically indicate one or more wires as required), are brought out of a connector disposed at the top 14 of the vessel in the indented cylindrical portion 60 thereof.

The conductors and insulating layers of the sensors 46 and 48 define capacitors, the capacitance value of which depends upon the level of water (in the case of the inner sensor 48) and the level of water and solid resin beads (or wet beads alone) extending about the outer sensor 46. Since the inner sensor responds only to the water level, the difference between the level of water and bead resin may be detected in response to the difference in capacitance presented by the inner and outer sensors. The sensor system, including the sensors and the circuitry for obtaining outputs in response to the capacitance presented by the sensors is the subject of a U.S. patent application filed concurrently with this application in the name of John C. Homer now Ser. No. 833,942. That application is enclosed as a appendix to this application.

The pan 20 also locates the sensor 44 in the sump region. A flexible conical seal 62 (a flat rubber sheet deformed to conical shape) seals against the outer periphery of the sensor 44 which passes through a hole 64 in the top 22 of the pan 20.

The vessel 10, in a practical embodiment may be six feet in diameter and six feet high (volume about 170 to 200 cubic feet). The porous support structure panel 28 covers the radius of 2½ to 3 feet from the center of the liner. The pan may have a radius of 7 inches. The discharge tube may suitably have a radius of 3 inches and the sensor 44 may be 1⅜ths inch in diameter. It will therefore be seen that the sump region is quite small in volume as compared to the volume of the liner vessel 10. The volume of the liner 10, when full, may for example be 170 cubic feet or more. Accordingly it will be readily apparent that any free standing water left in the sump region 19 will be less than the volume specified by governmental regulations. The system, therefore, can assure that the water remaining in the vessel does not exceed 0.5% of the volume of the vessel.

Water transmission to the sump region is through the porous bed support structure provided by the panel 28. The panel may be of any form which is sufficiently strong to support the bed and yet sufficiently porous to pass only the water while blocking the solid particles. In the structure shown in FIGS. 3 and 4*a*, *b* and *c*, the panel is provided by a pair of sheets 70 and 72 of honeycomb plastic material. These sheets have bulbous portions which are connected by webs. The bulbous portions are offset in the adjacent sheets so as to provide a substantially clear water path through the core of the panel. Other structures which provide a maze of paths, for example blow molded aluminum or foams having large, interconnected interstices, may be used. The filtering action is provided by a fabric covering. In the illustrated embodiment the covering consists of upper and lower sheets 76 and 78 which are preferably of plastic materials such as polypropylene which is heat sealed along the outer rim 74. The sheets 70 and 72 spring apart somewhat where they are not constrained by the rim 26 of the pan 28 (see FIG. 3). The panel may be octagonal in order to fit into the cylindrical vessel 10, the wall of which is shown by the line made up of long and short dashes in FIG. 4*c*. The diameter of the pan 20 is also shown by a line made up of long and short dashes so as to illustrate the relative diameters of the container internals in plan view. A relief slot 80 may be cut into the panel 28 along one of its sides so as to enable the panel to conform to the conical bottom 16 of the liner vessel 10.

Figure 2:
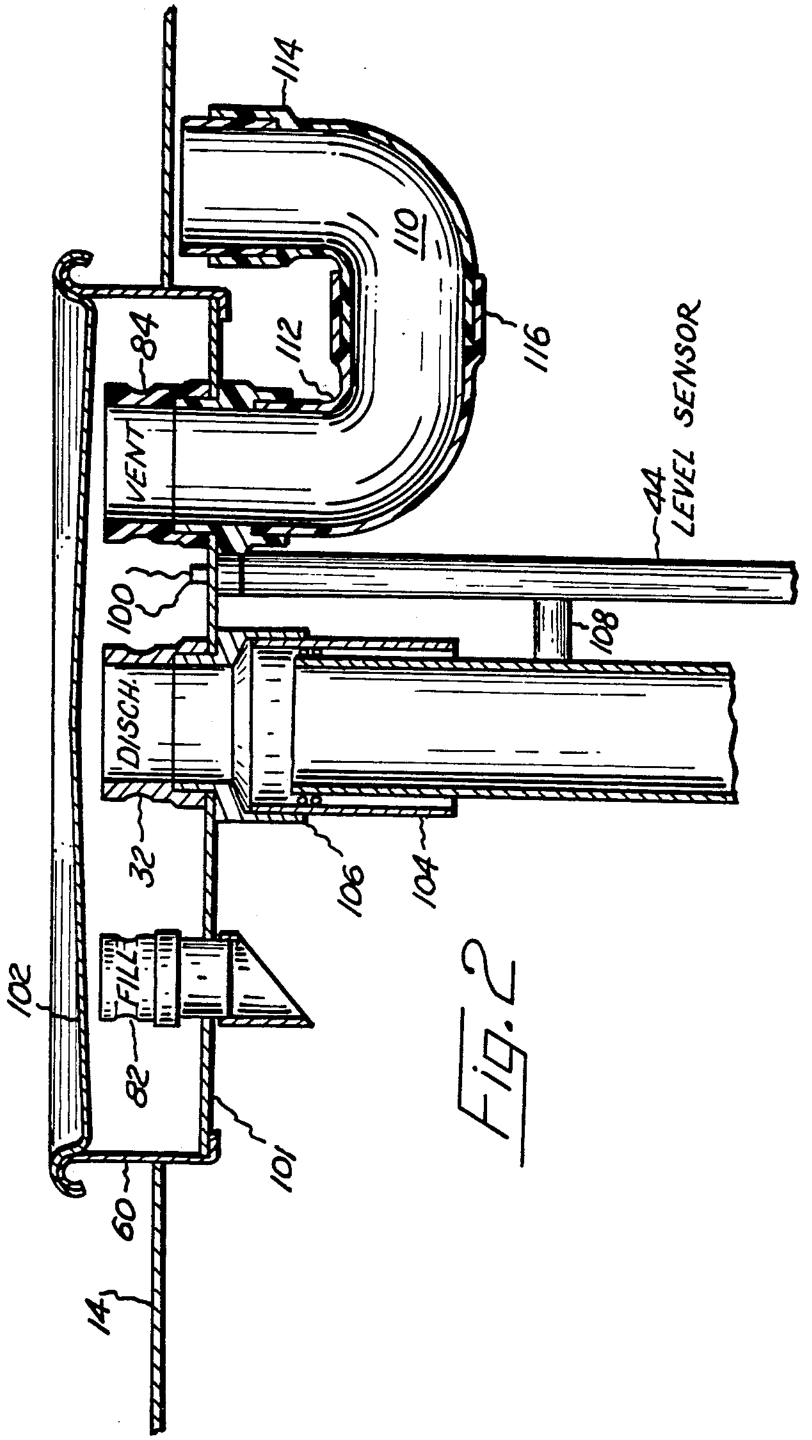
FIG. 2 is a fragmentary, sectional view illustrating the top of the vessel shown in FIG. 1 in which the slurry is de-watered.

The top portion of the liner vessel 10 is best shown in FIGS. 1 and 2. In addition to the coupling pipe 32 for the discharge tube 30, there is a fill pipe 82 and vent coupling pipe 84. These coupling pipes provide connection to hoses 86, 88 and 90 which have their other ends connected to connector joints 92, 94 and 96 (FIG. 1). There is also an electrical connector 98 (the connectors are all labeled CN). These connectors are provided in a portable skid in which the various components of the de-watering system are mounted. This skid may be disposed outside of a shielded area in the nuclear utility, while the vessel 10 which is being filled is disposed in the shielded area.

All of the coupling pipes and the connector end 100 of the level sensor 44 are attached to a seal plate 101 in the indented portion 60 of the top 14 of the vessel. The seal plate 101 prevents loss of potentially contaminated air to the environment. Additionally, the indented region may be sealed with a cover 102 after the hoses 86, 88 and 90 are decoupled and after the de-watering operations. Then, the filled container may be removed, by means of suitable lifting hooks (not shown) and transported to the disposal site.

To avoid undue stress of the discharge tube during lifting and transportation of vessel 10, a slip joint 104 having seals 106 near the top of the discharge tube 30, is provided. The level sensor also may be stabilized by a strut 108 between it and the discharge tube 30.

The vent coupling 84 also serves as an air passage into the vessel 10 during part of the de-watering process. In order to distribute the air which is blown into the vessel 10, a U-shaped tube which directs the air towards the top 14 of the vessel 10 so that it can be redirected from the top downwardly through the bed 18 is provided. This U-shaped pipe 110 is made up of two pipe elbows 112 and 114 suitably of conventional PVC piping which are screwed or cemented together at 116. The pipes may, for example, be three inches in diameter.

Referring again to FIG. 1 the radwaste material (the spent ion exchange resin slurry) flows from a holding tank through a flow control valve 152 having an operator 154 (compressed air or electric motor actuated). This valve 152 may be operated automatically from control logic 138 responsive to the level sensor 44. The level sensor provides two outputs when automatic de-watering operations are desired. These are a high level output when the level in the tank is almost at the top. FIG. 1 shows a level line 124 approaching the fully filled condition of the vessel 10. The other sensor output is the level difference switch output which occurs when the water level falls below the slurry or wet particulate (resin beads) level to which the outside sensor 46 (FIG. 3) is responsive. The high level detecting circuits 126, and the circuits for detecting when the water level is smaller by a predetermined amount (or depth) than the slurry level, which is indicated as the LDS circuit 128, are described in detail in the above referenced application, which is filed in the name of John C. Homer, concurrently herewith. There is another input to the control logic from a level detector, schematically illustrated at the sump 130, in a water/air separator 132. This separator may be of the cyclone type wherein a tangential flow of atomized (spray) water and air is brought into the separator and the water separates by impact against the walls of the separator. The level detector 130 detects when the water level in the separator is above a predetermined level. The level detector 130 includes detection circuitry indicated at LE and a switching circuitry illustrated at LSH which provides an output when the level exceeds the predetermined level in the separator 132.

When transfer is initiated by the system being turned on and the vessel 10 being empty, the slurry (which may be from approximately 5% to 20% solids (resin beads)) flows into the top 14 of the liner vessel 10. The flow rates may suitably be up to 50 gallons per minute utilizing vessels of approximately 200 cubic foot capacity. When the resin slurry reaches approximately 50% of the liner vessel's capacity, a positive displacement pump 140, which may suitably be a compressed air operated diaphragm pump, is turned on. This pump is operated by conventional valves and controls illustrated diagrammatically at 142 in FIG. 1. The system also includes a blower 144 which may be provided by a rotary vane vacuum pump. The pump is operated by a motor 146 and controlled by the control logic 138. A hand switch 148 (HS) may provide manual control if necessary. When manual control is used, display indicators or gauges and alarms driven by the level sensor 44 outputs, guide the operator to make the system perform the steps of the de-watering process. The blower is not running during the initial filling of the vessel. The flow of discharge water is from the sump 19 through the discharge tube 30, the hose 86 and other piping 150, through the water air separator 132 and thence to the pump 140. The water filtrate is discharged from the system, suitably to the radwaste holding tanks. The radiation and contamination level of the water which is discharged is usually low in content and either reused to slurry resin or purified and reused elsewhere in the utility.

As the vessel 10 continues to fill, if the water is withdrawn at a rate below that of the water entering the fill pipe into the liner vessel 10, the water will eventually accumulate until it reaches the high level as detected by the high level circuitry 126. At that point, the flow control valve 152 is shut until the level drops well below the high level or drops below the level of the settled solids in the vessel. In either of these cases, transfer of the slurry is re-established by opening the flow control valve 152. The filling process continues until water removal will not eliminate the high level condition. Then, the bead resins are causing the alarm state and the liner filling portion of the procedure is complete.

If, however, the water is being withdrawn at a rate in excess of the inlet rate of the slurry into the feed pipe, the level of the water will drop until it falls below the top of the bed of settled solids. At that point, the LDS circuitry 128 provides signals to the control logic 138 to turn the discharge pump 140 off. Then, de-watering temporarily ceases; additional fill slurry continues to flow into the vessel, thereby providing a level of water over the bed. The beads are permitted to settle in a closely packed array, which is the condition that is most efficient for utilization of the vessel's volume. This condition also maximizes the contacts between the beads in a tetrahedral array with three contact points between vertically adjacent beads. Such an array maximizes the flow paths through the bed for water flow to the bottom 16 of the liner 10.

While the liner is being filled, the vent 84 permits passage of displaced air from vessel 10 (opposite to the direction of flow illustrated at 110 in FIG. 1). The vent may be connected through a high efficiency particulate filter 120 (monitored by differential pressure element (DPE) 122) to atmosphere or the HVAC (heating ventilating and air conditioning) system of the plant.

When the liner vessel 10 is filled with bead resin and no more water can be removed by the pump 140 (the suction at the pump 140 is broken), a short, wait (static drain) period from five to fifteen minutes is allowed to transpire. Thereafter, the pump 140 is turned on again to discharge any water which has drained from the bed. The five to fifteen minute wait is desirable because the water/air separator 132 has a limited capacity and it is possible to overload during the next step of the process if a static drain interval is not permitted. Of course if a water air separator is much larger, the static drain waiting period may be eliminated.

After the waiting period the blower 144 is turned on. A by-pass vacuum relief valve 156 is connected across the blower 144 to permit operation of the discharge pump 140 concurrently but intermittently with the blower by decreasing the vacuum in the system to enable the diaphragm pump 140 to operate. The pressure may be reduced, for example, to less than 15 inches of mercury to reduce the differential pressure developed by the blower, vacuum pump 144. There is also a check valve 158 at the output of the blower 144 to prevent any flow through the blower during the initial steps of de-watering. This check valve 158 prevents flow in the opposite direction through the blower 144 during the initial pump down by the diaphragm pump 140 thereby permitting the diaphragm pump to evacuate the system up to the liner vessel 10 to a pressure sufficient to draw water from the liner through the discharge tube 30.

After the blower is turned on, it provides a current of high velocity air, for example at a rate of 300 cubic feet per minute (CFM) through the bed 18 and the porous panel 28 into the sump region 19. The flow of air through the bed pushes the interstitial water through the bed. In the case of bead resins, the flow of air is believed to free the water at the areas of point contact of the beads. The water is forced downwardly to the sump region 19. There the holes 36 cause the atomization of the water with the high velocity air. Suitably pressure at the blower intake ranges between near atmospheric to 24 inches of mercury. The upper head of the liner on top of the bed 18 is held at near atmospheric pressure to avoid overstressing the materials in that area of the vessel. The discharge from the vessel (at the sump region 19) drops in pressure (the system is a negative pressure system). The pressure drop is determined by the air flow (CFM). As noted above at a rate of 300 CFM and for a nominal bead resin bed 18, a pressure of approximately 10 inches of mercury is developed across the liner 10, from the top to the bottom thereof.

The air is separated from the water in the water/air separator 132. As noted above, when the water level in the separator sump increases, the diaphragm pump 140 is restarted and the water in the sump is returned to discharge, such as to the holding tanks which hold the waste slurry feed. The air which is separated by the water/air separator 132 passes through a coalescing filter 160. There, both entrained water, mist, and solids are removed. Water collects in the coalescer's sponge like filter element and flows by gravity to the lower end of the coalescing element where it falls into the coalescing enclosure, and passes through a line and a check valve 162 back to the discharge pipe from the water/air separator 132 to the diaphragm pump 140.

The air continues, after being further de-watered by the coalescer 160, to the intake of the blower 144. The blower then returns the air to the top of the vessel. The air picks up heat as it passes through the blower 144. Dewatering is assisted because the warm air returned to the bed 18 is unsaturated, hence, can hold more water, heats free water, hence, reduces its viscosity and finally, dehydrates the materials (the beads) at the top of the liner vessel 12 and redeposits this moisture further down in the cooler portion of the bed 18. There, it is pushed along by the cooled air until it reaches the sump region 19. The process continues until the level sensor in separator sump 130 detects no further water egress to the sump region. Of course, continued blowing dehydrates more and more of the bed. It is also possible after a period of blowing (for example after 4 hours into the de-watering cycle) to reverse the flow of air through the bed by interchanging the hoses 88 and 86. Then the warmed air will pass from the wet bottom of the bed to the dehydrated solids near the top of the bed. It has been found in tests that after a 4 to 8 hour dehydration cycle the water level as detected by level sensor 44 will not exceed the regulatory limits even after prolonged periods of standing.

The sensor which detects the water level is disposable with the filled liner vessel 10; the sensor 44 may be used to verify the free standing water level, from time to time, if desired. It is a feature of the invention that the container internals which are disposed of are relatively low in cost and yet provide for rapid de-watering and efficient utilization of the container volume.

From the foregoing description it will be apparent that there has been provided an improved system (method and apparatus) for removing liquid from slurries of liquid and particulate material, and particularly for the de-watering of radwaste materials, such as ion exchange resin beads. While the preferred embodiment and best mode of practice of the invention, as presently known, has been described, variations and modifications thereof including additional applications of the invention, within the scope of the invention, will undoubtedly suggest themselves to those skilled in the art. Accordingly, the foregoing description should be taken as illustrative and not in a limiting sense.

I claim:

1. The method of removing liquid from a slurry of liquid and solid material particles which comprises filling a vessel with said slurry, separating liquid from the solid material of said slurry at the bottom of said vessel, collecting said separated liquid at the bottom of said vessel, discharging the collected liquid from the bottom of said vessel to remove most of the liquid from said slurry leaving a bed of wet solid material in said vessel, passing gas through said bed from the top to the bottom thereof of sufficient volume and velocity to transfer liquid adhering to said particles to the bottom of said vessel, and discharging the liquid transferred with said gas from the bottom of said vessel.

2. The method according to claim 1 wherein said slurry consists of substantially spherical bead particles, said liquid is water, said gas is air, and said bed is a de-watered slurry of said bead particles.

3. The method according to claim 2 further comprising the step of detecting the difference between the level of said de-watered slurry of beads and the level of water alone in said vessel, and refilling said vessel with fresh slurry when said level of water alone is less by a predetermined depth than said level of said de-watered slurry, whereby said beads can settle into said bed in a volume efficient manner while underwater.

4. The method according to claim 3 wherein said gas-passing step is initiated when said vessel is substantially filled with said bead particles from which water has been discharged after a plurality of said refilling steps.

5. The method according to claim 4 wherein said gas-passing step is carried out by blowing air in a direction downwardly toward the bottom of said vessel while maintaining the top of said vessel substantially at atmospheric pressure.

6. The method according to claim 1 further comprising atomizing the liquid collected at the bottom of said vessel with the gas and discharging said atomized gas and liquid from said vessel.

7. The method according to claim 6 further comprising separating the liquid in said atomized liquid and gas, and recirculating said separated gas to said vessel.

8. The method according to claim 1 further comprising measuring the level of said liquid collected at the bottom of said tank and continuing said gas-passing step until said level corresponds to less than a desired percentage of free standing liquid volume to the total volume of said vessel.

9. The method according to claim 1 wherein said liquid and said gas are discharged through the center of said bed.

10. The method according to claim 9 wherein said liquid is collected in a conical volume having its apex at the center of said bed.

11. The method according to claim 10 wherein said step of separating said liquid from said solids at the bottom of said vessel is carried out by filtering said liquid from said slurry along the sides of said conical volume.

12. The method according to claim 1 further comprising reversing the flow of said gas to assist in the removal of liquid from the region of said bed near the bottom of said vessel.

13. Apparatus for de-watering slurries of liquid and solid particles which comprises a vessel having a conical bottom, means disposed upon said bottom for supporting a bed of said solid particles and providing for the egress of liquid radially therethrough to a liquid collection region around the apex of said conical bottom, a pipe communicating with said region for the discharge of the liquid collected in said region, and a level measuring probe extending longitudinally of said vessel into said region.

14. The apparatus according to claim 13 wherein said level measuring probe has first and second probe members, and means for permitting the egress of liquid into the vicinity of said first probe member.

15. The apparatus according to claim 14 wherein said second probe member is tubular, said first probe member being disposed within said second probe member and defining a longitudinally extending space therein, said liquid egress permitting means being a filtering member for blocking said particles and disposed across the bottom of said tubular second probe member.

16. The apparatus according to claim 14 further comprising means responsive to said first and second probe members for detecting the difference between the level of the water and the level of the de-watered slurry in said vessel, and means responsive to said level difference for refilling said vessel with slurry when said water level drops a predetermined distance below said de-watered slurry level whereby to enable the particles in said slurry to settle in said bed while under water.

17. Apparatus for de-watering slurries of liquid and solid particles which comprises a vessel having a conical bottom, means disposed upon said bottom for supporting a bed of said solid particles and providing for the egress of liquid radially therethrough to a liquid collection region around the apex of said conical bottom, a pipe communicating with said region for the discharge of the liquid collected in said region, and said pipe being a tube which extends longitudinally from the top to the bottom of said vessel with the bottom of said tube extending into said region.

18. The apparatus according to claim 17 wherein said discharge tube has a plurality of holes in the wall thereof spaced above the bottom of said tube and extending into said region.

19. The apparatus according to claim 17 wherein said tube is disposed coaxially with the conical bottom of said vessel.

20. The apparatus according to claim 19 further comprising a member providing a level probe extending longitudinally of said vessel alongside of said discharge tube, the bottom of said probe member extending into said region.

21. The apparatus according to claim 17 wherein said vessel has a top, a plurality of pipes extending through said top respectively for the flow of slurry into said tank, for coupling to the top of said discharge tube, and for the flow of air with respect to said vessel.

22. The apparatus according to claim 21 further comprising a joint providing a seal and permitting axial movement of said discharge tube with respect to its coupling pipe.

23. The apparatus according to claim 21 further comprising an elbow pipe extending downwardly from said air flow pipe and upwardly toward the top of said vessel, the top of said elbow tube being spaced from the top of said vessel.

24. The apparatus according to claim 21 further comprising a positive displacement pump in communication with said discharge tube coupling pipe for pumping water collected in said region, and a blower in communication with said air flow coupling pipe for blowing air through said bed to free interstitial water therein.

25. Apparatus for de-watering slurries of liquid and solid particles which comprises a vessel having a conical bottom, means disposed upon said bottom for supporting a bed of said solid particles and providing for the egress of liquid radially therethrough to a liquid collection region around the apex of said conical bottom, a pipe communicating with said region for the discharge of the liquid collected in said region, and means for blowing air through the bed of said particles downwardly from the top of said vessel to free interstitial liquid from said bed, said pipe also providing a discharge path for said air from said vessel.

26. The apparatus according to claim 25 further comprising means at the bottom of said discharge pipe, for atomizing the liquid blown with said air through said bed.

27. The apparatus according to claim 26 further comprising means for separating the atomized water and air discharged from said vessel, and said blowing means including a blower in communication with said separating means for returning the separated air to said vessel.

28. The apparatus according to claim 13, 17 or 25 including a slurry consisting of water and spent ion exchange bead particles which are substantially spherical and are contained in said vessel.

29. Apparatus for de-watering slurries of liquid and solid particles which comprises a vessel having a conical bottom, means disposed upon said bottom for supporting a bed of said solid particles and providing for the egress of liquid radially therethrough to a liquid collection region around the apex of said conical bottom, a pipe communicating with said region for the discharge of the liquid collected in said region, said supporting means comprising a panel of material presenting a structure with interstices therein sufficiently small to block said particles while allowing the flow of water under hydrostatic pressure of the water therethrough into said region, and said panel having a core covered by fabric.

30. Apparatus for de-watering slurries of liquid and solid particles which comprises a vessel having a conical bottom, means disposed upon said bottom for supporting a bed of said solid particles and providing for the egress of liquid radially therethrough to a liquid collection region around the apex of said conical bottom, a pipe communicating with said region for the discharge of the liquid collected in said region, said supporting means comprising a panel of material presenting a structure with interstices therein sufficiently small to block said particles while allowing the flow of water under hydrostatic pressure of the water therethrough into said region, and said discharge pipe being a tube extending from the top to the bottom of said vessel, said panel having a hole therein for the passage of said discharge tube into said region.

31. The apparatus according to claim 30 further comprising a pan shaped structure disposed centrally over said conical bottom in inverted position and upon said panel, said pan bridging said region, said tube extending through said pan structure.

32. Apparatus for de-watering slurries of liquid and solid particles which comprises a vessel having a conical bottom, means, disposed upon said bottom for supporting a bed of said solid particles and providing for the egress of liquid radially therethrough to a liquid collection region around the apex of said conical bottom, a pipe communicating with said region for the discharge of the liquid collected in said region, said supporting means comprising a panel of material presenting a structure with interstices therein sufficiently small to block said particles while allowing the flow of water under hydrostatic pressure of the water therethrough into said region, and a level probe extending longitudinally of said vessel along said discharge pipe, said panel also having a hole for the passage of said probe into said region.

33. The apparatus according to claim 32 further comprising a pan shaped structure disposed centrally over said conical bottom in inverted position and upon said panel and bridging said region, said pipe extending through said pan structure and said probe also extending through said pan structure.

34. Apparatus for de-watering slurries of liquid and solid particles which comprises a vessel having a conical bottom, means disposed upon said bottom for supporting a bed of said particles and providing for the egress of liquid radially therethrough to a liquid collection region around the apex of said conical bottom, a pipe communicating with said region for the discharge of the liquid collected in said region, said supporting means comprising a panel of material presenting a structure with interstices therein sufficiently small to block said particles while allowing the flow of water under hydrostatic pressure of the water therethrough into said region, and said panel comprising a first honeycomb layer having top and bottom surfaces, a second honeycomb layer also having top and bottom surfaces, and said bottom surface of said first layer being disposed adjacent to the top surface of said second layer and fabric material encompassing at least said top surface of said first layer, said bottom surface of said second layer being disposed adjacent to said conical bottom of said vessel.

35. A system for removing liquid from a slurry of liquid and of solid particles which comprises a vessel, means for filling said vessel with said slurry, means for separating the liquid of said slurry from the solid particles of said slurry, said separating means being disposed at the bottom of said vessel, means for collecting said separated liquid at the bottom of said vessel, means for discharging the collected liquid from the bottom of said vessel to remove most of the liquid from said slurry leaving a bed of wet solid particles in said vessel, means for passing gas through said bed from the top to the bottom thereof in sufficient volume and velocity to transfer liquid adhering to said particles to the bottom of said vessel, and means for discharging the liquid transferred with the gas from the bottom of said vessel.

36. The system according to claim 35 wherein said slurry consists of substantially spherical bead particles, said liquid is water, said gas is air, and said bed is a de-watered slurry of said bead particles, and said separating means and passing means comprise means for separating said substantially spherical bead particles from said water of said slurry, and said gas passing means comprises means for passing said air.

37. The system according to claim 35 further comprising means for detecting the difference between the level of said slurry and the level of water alone in said vessel, and means for refilling said vessel with fresh slurry when said level of water alone is less by a predetermined length than the level of said slurry whereby said beads can settle into said bed while under water.

38. The system according to claim 35 further comprising means for initiating the operation of said gas-passing means when said vessel is substantially filled with said bed of particles from which water has been discharged after operation of said refilling means.

39. The system according to claim 35 further comprising means for atomizing the liquid collected at the bottom of said vessel with the gas blown through said bed, and means for discharging said atomized gas and liquid from said vessel.

40. The system according to claim 39 further comprising means for separating the liquid and gas from said atomized gas and liquid which is discharged from said vessel, and means for recirculating the gas separated by said separating means back to said vessel.

* * * * *